United States Patent [19]

Müller

[11] Patent Number: 4,793,789

[45] Date of Patent: Dec. 27, 1988

[54] DOUGH-ROUNDING APPARATUS

[75] Inventor: Gerhard Müller, Asperg, Fed. Rep. of Germany

[73] Assignee: Werner & Pfleiderer GmbH, Stuttgart, Fed. Rep. of Germany

[21] Appl. No.: 121,479

[22] Filed: Nov. 17, 1987

[30] Foreign Application Priority Data

Nov. 24, 1986 [DE] Fed. Rep. of Germany ....... 3640051

[51] Int. Cl.$^4$ .......................... A21C 7/00; A21C 7/04
[52] U.S. Cl. ................................................... 425/332
[58] Field of Search ............................... 425/332, 333

[56] References Cited

U.S. PATENT DOCUMENTS

| | | | |
|---|---|---|---|
| 776,731 | 12/1904 | Dietz | 425/332 |
| 786,042 | 3/1905 | Loncaric | 425/332 |
| 835,204 | 11/1906 | Streich | 425/333 |
| 978,440 | 12/1910 | Eggenhofer | 425/332 |
| 1,236,505 | 8/1917 | Van Houten | 425/332 |
| 2,623,478 | 12/1952 | Verheij | 425/333 |

FOREIGN PATENT DOCUMENTS 0021687 10/1905 Austria ................................ 425/332

Primary Examiner—Willard Hoag
Attorney, Agent, or Firm—Roberts, Spiecens & Cohen

[57] ABSTRACT

A dough-rounding apparatus in which first and second groups of elements undergo relative revolving movements to round pieces of dough. The elements of one group have chambers for receiving the pieces of dough, the elements of the other group being formed by circular recesses in a working surface which are opposite the chambers. The working surface has a limited region immediately adjacent to and surrounding each circular recess which is of broken, irregular formation to achieve a roughening of the working surface different from the circular recess. The limited region can be circular and concentric with the associated circular recess, the limited region having a diameter between 1.6 and 2.2 times the diameter of the circular recess.

16 Claims, 1 Drawing Sheet

DOUGH-ROUNDING APPARATUS

FIELD OF THE INVENTION

The invention relates to dough-rounding apparatus of the type having first and second group of elements which undergo revolving movements with respect to one another, the elements of one group having chambers for receiving pieces of dough, the elements of the other group being formed in a working surface by circular recesses which are opposite the chambers.

DESCRIPTION OF THE PRIOR ART

Dough-rounding apparatus of the above-type include both working machines in accordance with DE-PS No. 1 03 437, in which working cups moved in a circle are arranged above a belt which serves as working surface, as well as so-called drum rounders in accordance with AT-PS No. 222 065 which have two drums arranged concentrically one within the other, turnable around a common axis the outer drum containing working cells and the shell of the inner drum carrying out revolving movements as the working surface.

In these known working machines, the working surfaces have circular recesses forming work stations as is customary also in the case of working plates for knife star, dough-dividing working machines. These recesses are formed as step-like concentric rings preferably with a sawtooth profile for developing a certain adherence of the pieces of dough to the working surface upon the rounding. However, this does not satisfy the requirements particularly, for automatic dough-dividing and working machines. When firmer doughs with a relatively dry surface due to lower water content are worked on such machines, which in many cases are provided with a drum rounder in accordance with Austrian Patent No. 222 065, the pieces of dough are not grasped rapidly enough or only to too slight an extent by the recesses at the working stations. The result is that the pieces of dough are incompletely worked or not worked at all.

In order to remedy this disadvantage, the entire surface of the inner drum of drum rounders has been provided with a fluting. As an additional measure, the recesses at the working stations have also been provided with a fluted working surface. Despite these measures, it was not possible to obtain a satisfactory result in all cases since, as a result of the overall presence of the fluting on the working surface, the surface of the pieces of dough was torn up over practically its entire application surface. Therefore, a proper "working seam," which plays an important role for the quality of the finished baked article, was not developed.

Another disadvantage of the completely fluted working surfaces is that they rapidly become dirty, particularly when working soft doughs, since residues of dough and particles of flour become secured in the recesses of the fluting, the particles of flour being formed into paste under the influence of the moisture in the dough and leading to a firmly adherent coating. Therefore, the working drums must be frequently cleaned at considerable expense and this also involves interruptions in operation.

SUMMARY OF THE INVENTION

An object of the invention is to provide improvements in the conventional dough-rounding apparatus which will enable treatment with all dough compositions and consistencies in which danger of soiling is minimized.

The above and further objects of the invention are achieved by providing a limited region immediately adjacent to and surrounding each circular recess that forms a working station in one of the groups of elements, said limited region having a broken irregular formation in the working surface of the group of elements to provide a roughening thereof.

The improvement according to the invention is based, on the one hand, on the discovery that substantially no soiling takes place in the circular recesses and in a region of the working surface adjoining same on which the piece of dough rolls during the working operation. This self-cleaning action is based probably on the fact that any pieces of dough or flour present in the hollows of the roughening zone cannot deposit thereat since they adhere to the piece of dough which is being rolled thereover and which at times penetrates into the hollows and are carried along by it. On the other hand, it has been recognized that the roughening of the working surface in a region directly adjoining the recesses increases the active working zone as compared to a working surface which has only one recess at the working station and thus assures a dependable entrainment in the case of relatively firm pieces of dough. By limiting this roughening region, the bottom of the piece of dough is prevented from being torn pp too much and preventing the formation of a "seam." Since the working surface is smooth outside of the region of the roughening zone, cleaning can be carried out without great expense. The features of the invention represent an optimal combination for rounding both firm and soft doughs.

In a particularly effective embodiment of the invention the limited region of the roughening zone is circular and concentric with the associated circular recess, said limited region having a diameter between 1.6 and 2.2 times the diameter of the circular recess.

The broken irregular formation in the limited region of the roughening zone is preferably formed by a plurality of intersecting grooves which interrupt the working surface.

In accordance with a feature of the invention, the grooves have a depth which decreases from the associated recess radially outwards to the boundary of the limited region. At said boundary, the grooves smoothly merge with the working surface.

In further accordance with the invention, the grooves are bounded by walls which are inclined.

In a particularly characterizing fashion, the invention contemplates that the grooves which form the broken irregular form a tion in the limited region intersect one another at right angles and form a waffle-like pattern.

DETAILED DESCRIPTION OF PREFERRED EMBODIMENTS

Figure 1:
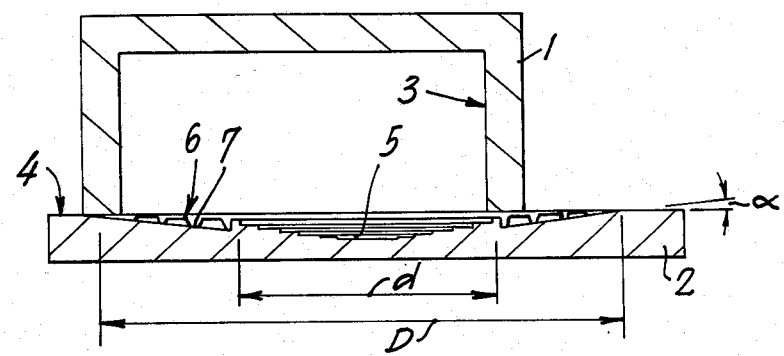
FIG. 1 is a vertical sectional view through apparatus according to the invention for forming pieces of dough into round shapes.

Referring to the drawing therein is seen a dough-rounding device which consists essentially of two groups of elements 1 and 2 which carry out revolving movements relative to each other, only the essential components being shown, without the conventional support frame, drive means and the like.

In the group of elements 1 there are provided chambers 3 to receive pieces of dough. These chambers can be of any known shape. The chambers 3 are formed, for instance, by working cups or bowls which are fastened in transverse rows to a support which undergoes a revolving movement at all times parallel to itself (FIG. 1). In a drum rounder, the outer drum represents the group 1 and the chambers 3 correspond to working cells in the drum.

The group 2 has a working surface 4 which tightly closes off the openings of the chambers 3 except for a clearance for the necessary movement. At the center of the revolving movement of each chamber there is provided in the working surface 4 a workstation formed by a conventional circular recess 5 which contains step-like annular surfaces having sharp edges, the annular surfaces being inclined outward so that, as seen in cross section, each step has a saw tooth-like profile.

Figure 3:
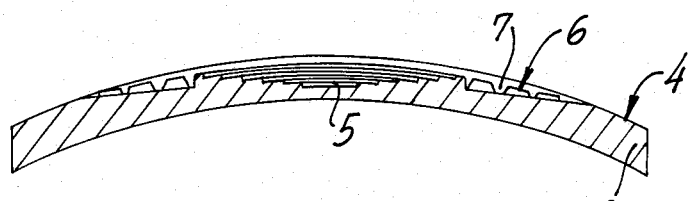
FIG. 3 is a vertical sectional view similar to FIG. 1, showing a portion of a drum rounder according to another embodiment of the invention.

The working surface 4 in FIG. 1 is a flat surface which, for example, represents the surface of a working belt which is advanced stepwise and over which the working cups or bowls carry out the revolving working movements. The working belt can be a plate belt, composed of pivotally interconnected plates on each of which there is arranged a row of recesses 5 forming working stations In an alternative arrangement, the working surface 4 of the group 2 can, however, also carry out the revolving working movements. This is true in particular in the case of drum rounders in which the working surface is located on an inner drum which is arranged coaxially with respect to the outer drum. Such a working surface 4 of arcuate curvature is shown in FIG. 3.

Figure 2:
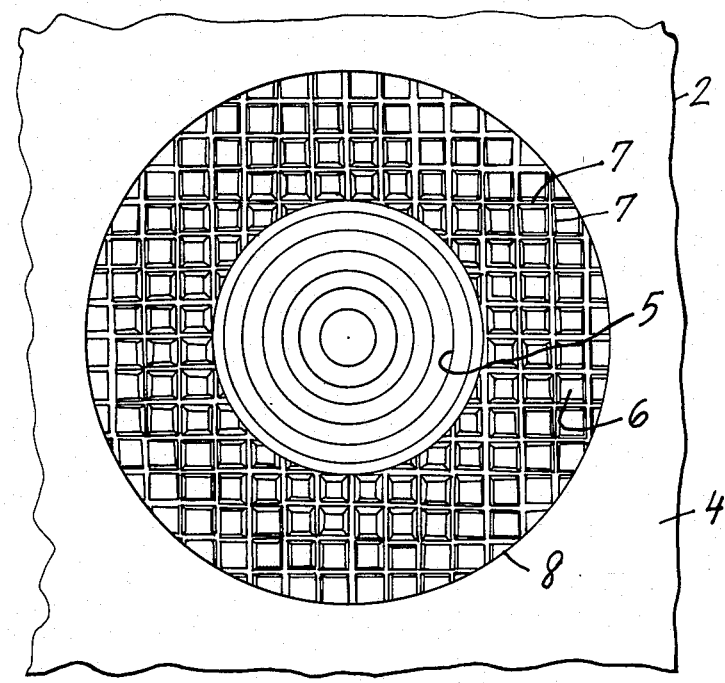
FIG. 2 is a top plan view of a part of the apparatus in FIG. 1.

In accordance with the invention, within a limited region directly surrounding the circular recesses 5, the working surface has a roughening zone 6. As the roughening zone, there can be used any type of broken, irregular formation or interruption of the smooth surface 4 of the group 2 by which a certain gripping effect is produced for the pieces of dough. Preferable, however, is a fluting which is formed by a plurality of intersecting grooves 7 which are formed in and interrupt the working surface 4. The grooves 7 preferably intersect at right angles, as shown in FIG. 2 to form a waffle-like pattern. Furthermore, the grooves 7 are bounded by inclined walls. These measures promote the self-cleaning of the working surface.

In order to provide the pieces of dough with a sufficient additional gripping effect at the working stations 5, the roughening zones 6 are of determined extent around the recesses 5. Namely, each of the roughening zones 6 is limited radially outwards by a circle 8, indicated in FIG. 2 in chain dotted outline and concentric with the associated recess 5, the diameter D of the roughening zone 6 being equal to 1.6 to 2.2 times the diameter d of the recess 5. The diameter of tee recess 5 corresponds approximately to the diameter of the circle on which groups 1 and 2 move relative to each other.

As can be seen in the drawing, the depth of the grooves 7 decreases from the edge of the recess 5 radially outwards to the circle 8 at which the grooves smoothly merge with the smooth working surface 4. Because of this variation in depth of the grooves, the intensity of the roughening in zone 6 decreases continuously to zero from the inside boundary to the outside boundary and the action on the piece of dough gradually is reduced radially outwards This measure not only improves the result of the working operation but also favors the self-cleaning. This dual effect is further increased if the working surface 4 is inclined in the roughening zone 6, i.e. from the circle 8 towards the recess 5 by an angle of inclination α of 1° to 10°.

The embodiment shown in FIG. 3 corresponds, as far as the shape of the grooves 7 and the inclination of the working surface 4 in the region of the roughening zone 6, to FIG. 1. The embodiment of FIG. 3 differs in that group 2 has been curved along a circular arc. In top plan view, the embodiment of FIG. 3 corresponds with FIG. 2.

Although the invention has been described in relation to specific embodiments thereof, it will become apparent to those skilled in the art that numerous modifications and variations can be made within the scope and spirit of the invention as defined in the attached claims.

What is claimed is:

1. In a dough-rounding apparatus having first and second groups of elements which undergo revolving movements with respect to one another, the elements of one group having chambers for receiving pieces of dough, the elements of the other group being formed in a working surface by circular recesses which are opposite the chambers, the improvement comprising a limited region immediately adjacent to and surrounding each circular recess, said limited region having a broken, irregular formation in said working surface to provide a roughening thereof.

2. The improvement as claimed in claim 1 wherein said limited region is circular and concentric with the associated circular recess, said limited region having a diameter between 1.6 and 2.2 times the diameter of the circular recess.

3. The improvement as claimed in claim 1 wherein the broken irregular formation in said limited region is formed by a plurality of intersecting grooves which interrupt the working surface.

4. The improvement as claimed in claim 3 wherein said grooves have a depth which decreases from the associated recess radially outwards to the boundary of said limited region.

5. The improvement as claimed in claim 4 wherein said grooves are bounded by walls which are inclined.

6. The improvement as claimed in claim 1 wherein said working surface is inclined towards said recesses in said limited regions with said roughening.

7. The improvement as claimed in claim 6 wherein said angle of inclination is between 1° and 10°.

8. The improvement as claimed in claim 1 wherein the broken irregular formation in said limited region is formed by a plurality of grooves which intersect on another at right angles to interrupt the working surface by forming a waffle-like pattern.

9. The improvement as claimed in claim 8 wherein said limited region has an outer periphery at which said region smoothly merges with said working surface.

10. Dough-rounding apparatus comprising first and second groups of elements which undergo relative revolving movement the elements of one group having chambers for receiving pieces of dough, the elements of the other group being formed by circular recesses in a working surface which are opposite the chambers, said working surface having a limited region immediately adjacent to and surrounding each circular recess, said limited region providing a broken, irregular formation in said working surface to achieve a roughening thereof different from said circular recess.

11. Apparatus as claimed in claim 10 wherein said limited region is circular and concentric with the associated circular recess, said limited region having a diameter between 1.6 and 2.2 times the diameter of the circular recess.

12. Apparatus as claimed in claim 11 wherein the broken irregular formation in said limited region is formed by a plurality of intersecting grooves which interrupt the working surface.

13. Apparatus as claimed in claim 12 wherein said grooves have a depth which decreases from the associated recess radially outwards to the boundary of said limited region.

14. Apparatus as claimed in claim 13 wherein said grooves are bounded by walls which are inclined.

15. Apparatus as claimed in claim 11 wherein the broken irregular formation in said limited region is formed by a plurality of grooves which intersect on another at right angles to interrupt the working surface by forming a waffle-like pattern.

16. Apparatus as claimed in claim 15 wherein said recesses are formed with circular steps.

* * * * *